United States Patent
Pei

(10) Patent No.: US 10,595,634 B2
(45) Date of Patent: Mar. 24, 2020

(54) ADJUSTABLE ANGLE TELEVISION MOUNTING APPARATUS

(71) Applicant: Xubo Pei, Guangdong (CN)

(72) Inventor: Xubo Pei, Guangdong (CN)

(*) Notice: Subject to any disclaimer, the term of this patent is extended or adjusted under 35 U.S.C. 154(b) by 0 days.

(21) Appl. No.: 16/036,642

(22) Filed: Jul. 16, 2018

(65) Prior Publication Data

US 2019/0191879 A1 Jun. 27, 2019

(30) Foreign Application Priority Data

Dec. 25, 2017 (CN) .................... 2017 2 1838412 U

(51) Int. Cl.
| | |
|---|---|
| *F16M 11/10* | (2006.01) |
| *A47B 97/00* | (2006.01) |
| *F16M 13/02* | (2006.01) |
| *F16M 11/20* | (2006.01) |
| *F16M 11/04* | (2006.01) |
| *F16M 11/24* | (2006.01) |

(52) U.S. Cl.
CPC ........... *A47B 97/001* (2013.01); *F16M 11/04* (2013.01); *F16M 11/105* (2013.01); *F16M 11/2064* (2013.01); *F16M 11/2085* (2013.01); *F16M 11/2092* (2013.01); *F16M 11/24* (2013.01); *F16M 13/02* (2013.01); *F16M 2200/06* (2013.01)

(58) Field of Classification Search
CPC .. F16M 11/105; F16M 11/041; F16M 11/126; F16M 2200/022; A47B 81/061
USPC ..... 248/917–923, 276.1, 287.1, 286.1, 278.1
See application file for complete search history.

(56) References Cited

U.S. PATENT DOCUMENTS

| | | | | |
|---|---|---|---|---|
| 5,201,896 | A * | 4/1993 | Kruszewski | F16M 11/10 248/278.1 |
| 6,863,252 | B2 * | 3/2005 | Bosson | F16M 11/041 248/131 |
| 7,380,760 | B2 * | 6/2008 | Dittmer | F16M 11/041 248/278.1 |
| 7,398,950 | B2 * | 7/2008 | Hung | F16M 11/10 248/276.1 |
| 7,448,584 | B2 * | 11/2008 | Chen | F16M 11/10 248/122.1 |
| 7,513,469 | B1 * | 4/2009 | Ciungan | F16M 11/046 248/161 |
| 7,561,423 | B2 * | 7/2009 | Turusaki | F16M 13/02 248/917 |

(Continued)

*Primary Examiner* — Nkeisha Smith
(74) *Attorney, Agent, or Firm* — Hauptman Ham, LLP

(57) ABSTRACT

The present disclosure provides an adjustable angle television mounting apparatus comprising a wall plate, first support arms, a second support arm, an adjustment base and a mounting member. The wall plate is configured to mount to a wall. The mounting member is configured to mount a television. The first support arms are actively mounted to the wall plate through first arm threaded rods. The second support arm is actively mounted to the first support arms through a second arm threaded rod. The adjustment base is mounted to a front end of the second support arm. The mounting member is coupled to the adjustment base to form a structure which can obliquely rotate front and rear and rotate vertically. The television can be tilted upwards, downwards, rotated left or right, and raised or lowered according to needs. The entire apparatus can withstand greater weight, and fast installation can be achieved.

15 Claims, 6 Drawing Sheets

(56) References Cited

U.S. PATENT DOCUMENTS

| | | | | |
|---|---|---|---|---|
| 7,600,728 B2* | 10/2009 | Petrick | F16M 11/10 | 248/220.21 |
| 7,823,850 B1* | 11/2010 | Lam | F16M 11/10 | 248/292.14 |
| 7,832,700 B2* | 11/2010 | Ciungan | F16M 11/10 | 248/281.11 |
| 7,854,415 B2* | 12/2010 | Holbrook | F16M 11/10 | 248/125.2 |
| 8,100,372 B2* | 1/2012 | Vlies | F16M 11/10 | 248/220.1 |
| 8,235,341 B2* | 8/2012 | Taylor | F16M 11/10 | 248/201 |
| 8,561,955 B2* | 10/2013 | Stemple | F16M 11/04 | 248/276.1 |
| 8,651,444 B2* | 2/2014 | Sapper | F16M 11/2021 | 248/218.4 |
| 8,746,635 B2* | 6/2014 | Kim | F16M 11/10 | 248/133 |
| 8,757,568 B2* | 6/2014 | Ko | F16M 13/02 | 211/86.01 |
| 8,827,226 B2* | 9/2014 | Townsend | F16M 11/10 | 220/3.5 |
| 2002/0011544 A1* | 1/2002 | Bosson | F16M 11/041 | 248/121 |
| 2004/0262474 A1* | 12/2004 | Boks | F16M 11/041 | 248/276.1 |
| 2007/0041150 A1* | 2/2007 | Short | F16M 11/10 | 361/679.22 |
| 2007/0095992 A1* | 5/2007 | Dozier | F16M 11/10 | 248/276.1 |
| 2007/0102607 A1* | 5/2007 | Koh | F16M 11/10 | 248/276.1 |
| 2007/0170325 A1* | 7/2007 | Ryu | F16M 11/08 | 248/276.1 |
| 2008/0006751 A1* | 1/2008 | Chen | F16M 11/10 | 248/278.1 |
| 2008/0029669 A1* | 2/2008 | Olah | B60R 11/0229 | 248/276.1 |
| 2008/0035816 A1* | 2/2008 | Ciungan | F16M 11/10 | 248/276.1 |
| 2008/0038050 A1* | 2/2008 | Chen | F16M 11/105 | 403/62 |
| 2008/0258029 A1* | 10/2008 | Zhang | F16M 11/08 | 248/284.1 |
| 2009/0173860 A1* | 7/2009 | Remy | F16M 11/10 | 248/278.1 |
| 2009/0179128 A1* | 7/2009 | Boberg | F16M 11/10 | 248/278.1 |
| 2011/0253856 A1* | 10/2011 | Short | F16M 13/02 | 248/222.14 |
| 2011/0303810 A1* | 12/2011 | Xue | F16M 11/041 | 248/220.22 |
| 2013/0221174 A1* | 8/2013 | Sapper | F16M 11/2021 | 248/218.4 |

\* cited by examiner

ADJUSTABLE ANGLE TELEVISION MOUNTING APPARATUS

TECHNICAL FIELD

The present disclosure relates to technical fields of television mounting fittings, and in particular relates to a fixing apparatus for mounting a television to a wall, of course, it can also be used to mount a display.

BACKGROUND

With the elimination of traditional cathode ray tube (CRT) televisions, the flat panel televisions have been fully prompted. One major advantage of the flat panel televisions is their small footprint and light weight. Therefore, the flat panel televisions can be mounted to a wall directly, this can further reduce the space occupied. A traditional way to mount a flat panel television is to punch holes in the wall, mount the television bracket with screws inserting into the holes, and then mount the television on the television bracket. The disadvantages of the traditional way is that the structure of the television bracket is fixed. After the television is mounted on the television bracket, the posture of the television is fixed, and it is impossible to adjust an orientation and a tilt angle of the television according to actual viewing requirements. Some television brackets that can be adjusted have disadvantages of complicated structure, single adjustment way (usually only left and right rotation adjustment), and small adjustment range, which restricts its popularization and application.

SUMMARY

The present disclosure aims to cure the defects of the prior art and provides an adjustable angle television mounting apparatus with more reasonable structure design, more convenient adjustment operation, and simultaneous adjustment of angle and orientation.

To solve above technical problems, the present disclosure discloses an adjustable angle television mounting apparatus, which comprises a wall plate, first support arms, a second support arm, an adjustment base and a mounting member. The wall plate is configured to mount to a wall. The mounting member is configured to mount a television. The first support arms are actively mounted to the wall plate through first arm threaded rods to form a left and right rotating structure. The second support arm is actively mounted to the first support arms through a second arm threaded rod to form a left and right rotating structure. The adjustment base is mounted to a front end of the second support arm. The mounting member is coupled to the adjustment base to form a structure which can obliquely rotate front and rear and rotate vertically. The second support arm and the first support arms cooperate to make the television rotate towards left or right.

Furthermore, the front end of the second support arm is equipped with a fixed base through a head threaded rod. The adjustment base is mounted to the fixed base. The adjustment base defines two tilt adjusting holes at two sides of an upper portion thereof respectively. Each tilt adjusting hole has an arc-shaped strip structure. A bottom portion of the adjustment base is coupled to the fixed base through screws. The upper portion of the adjustment base is coupled to the fixed base through tilt adjusting screws each passing through one corresponding tilt adjusting hole, to form a structure which can obliquely rotate front and rear. An angle of rotating front and rear is −15~+5 degrees. There is an anti-slip spacer located between each tilt adjusting screw and the adjustment base. When the tilt adjusting screw is released, the mounting member can be adjusted up and down in a front-rear direction so that the television is tilted up or down.

Furthermore, the bottom portion of the adjustment base defines a vertical adjustment hole having an arc-shaped strip structure. The bottom portion of the adjustment base is coupled to the mounting member through vertical adjusting screws passing through the vertical adjustment hole to form a structure which can rotate left and right. An angle of rotating left and right is −4~+4 degrees. When the vertical adjusting screws are released, the mounting member can be adjusted left and right, the television is tilted to left or right to form a non-horizontal posture.

Furthermore, the wall plate comprises two mounting bases at upper and bottom portions thereof. The upper first support arm is mounted to one corresponding mounting base through one first arm threaded rod to form a rotatable structure. The bottom first support arm is mounted to another corresponding mounting base through another first arm threaded rod to form a rotatable structure. A plastic cover is provided to cover the wall plate. The plastic cover encloses the mounting bases. The two first support arms each is equipped with one first arm cable clamp for strengthening the structure. The first arm cable clamp encloses main part of the first support arm. The second support arm is equipped with the second arm cable clamp for strengthening the structure. The second arm cable clamp encloses main part of the second support arm. After adding the first arm cable clamps and the second cable clamp, they can increase the strength of the first support arms and the second support arm and increase the overall load-bearing capacity.

Furthermore, there are pipe stoppers equipped with ends of the two first support arms coupled to the mounting base for strengthening the structure. Each first arm threaded rod passes through the corresponding first support arm and the corresponding pipe stopper, and then couples with the mounting base. There is a pipe stopper equipped with the front end of second support arm for strengthening the structure. The pipe stopper can increase the strength of a junction of the support arm and increase the overall load-bearing capacity.

Furthermore, the mounting member is provided with a strengthening portion at a back thereof. An upper portion of the strengthening portion is provided with a hanging arm which protrudes rearwards to form a hook shape. The mounting member is fastened on the adjustment base through the hanging arm to form a fixed structure. The television or the display can be mounted by hanging and can be quickly mounted.

Furthermore, the mounting member comprises a plurality of retractable bars for mounting the television. Each retractable bar defines a plurality of mounting holes thereof.

Furthermore, the number of the retractable bars are four. Four retractable bars are set diagonally so that they can accommodate different sizes of televisions or displays.

Furthermore, two spacer rings are arranged on an upper and a lower sides of the second support arm respectively. The second arm threaded rod passes through the second support arm and the spacer rings and is coupled with the two first support arms. This structure makes the second support arm rotate smoothly and stably.

Furthermore, the first support arms and the second support arm are welded using square tubes and metal sleeves. They have higher structural strength and bearing capacity.

In present disclosure, the television (or display) can be tilted upwards, downwards, rotated left or right, and raised or lowered height by mutual cooperation of the wall plate, the first support arms, the second support arm, the adjustment base and the mounting member, so that it can be flexibly adjusted according to the actual observation needs of users, which improves its adaptability. At the same time, the entire apparatus has simple structure, high strength, good stability, and can withstand greater weight.

BRIEF DESCRIPTION OF THE ACCOMPANYING DRAWINGS

To describe the technology solutions in the embodiments of the present disclosure more clearly, the following briefly introduces the accompanying drawings required for describing the embodiments. Obviously, the accompanying drawings in the following description show merely some embodiments of the present disclosure, those of ordinary skilled in the art may also obtain other drawings based on these drawings without any creative efforts.

In the figures, 1 represents a wall plate, 2 represents a plastic cover, 3 represents a pipe stopper, 4 represents a second arm threaded rod, 5 represents a first arm cable clamp, 6 represents a first support arm, 7 represents a spacer ring, 8 represents a second support arm, 9 represents a mounting base, 10 represents a head threaded rod, 11 represents a first arm threaded rod, 12 represents a second arm cable clamp, 13 represents a fixed base, 14 represents an adjustment base, 15 represents a tilt adjusting screw, 16 represents a retractable bar, 17 represents a mounting member, 18 represents a tilt adjusting hole, 19 represents a vertical adjusting screw. 20 represents a vertical adjusting hole, 21 represents a strengthening portion, 22 represents a hanging arm, 23 represents a television.

DETAILED DESCRIPTION OF ILLUSTRATED EMBODIMENTS

The technology solutions in the embodiments of the present disclosure will be described clearly and completely hereinafter with reference to the accompanying drawings in the embodiments of the present disclosure. Obviously, the described embodiments are merely some but not all embodiments of the present disclosure. All other embodiments obtained by a person of ordinary skilled in the art based on the embodiments of the present disclosure without creative efforts shall fall within the protection scope of the present disclosure.

Figure 1:
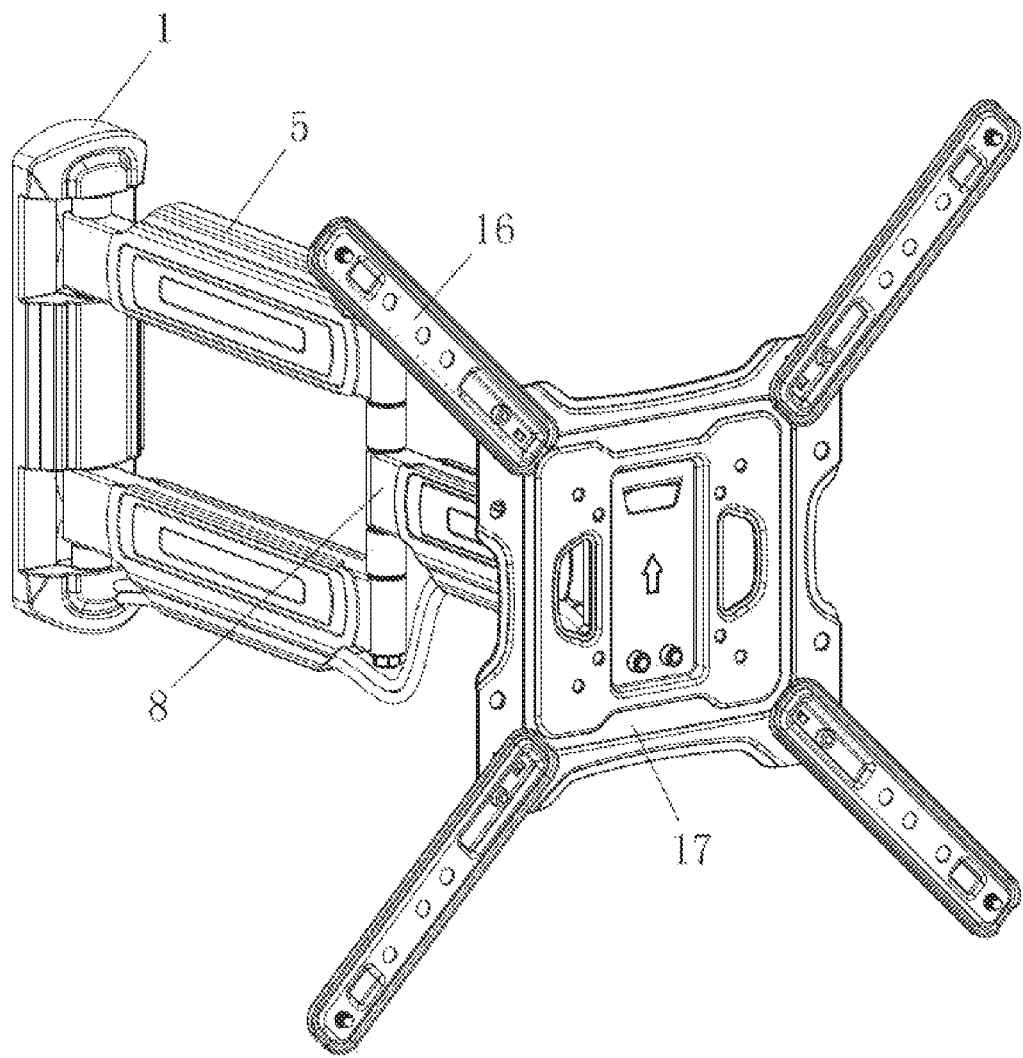
FIG. 1 is a diagram of a three-dimensional structure of an adjustable angle television mounting apparatus in accordance with an embodiment of the present disclosure.
Figure 2:
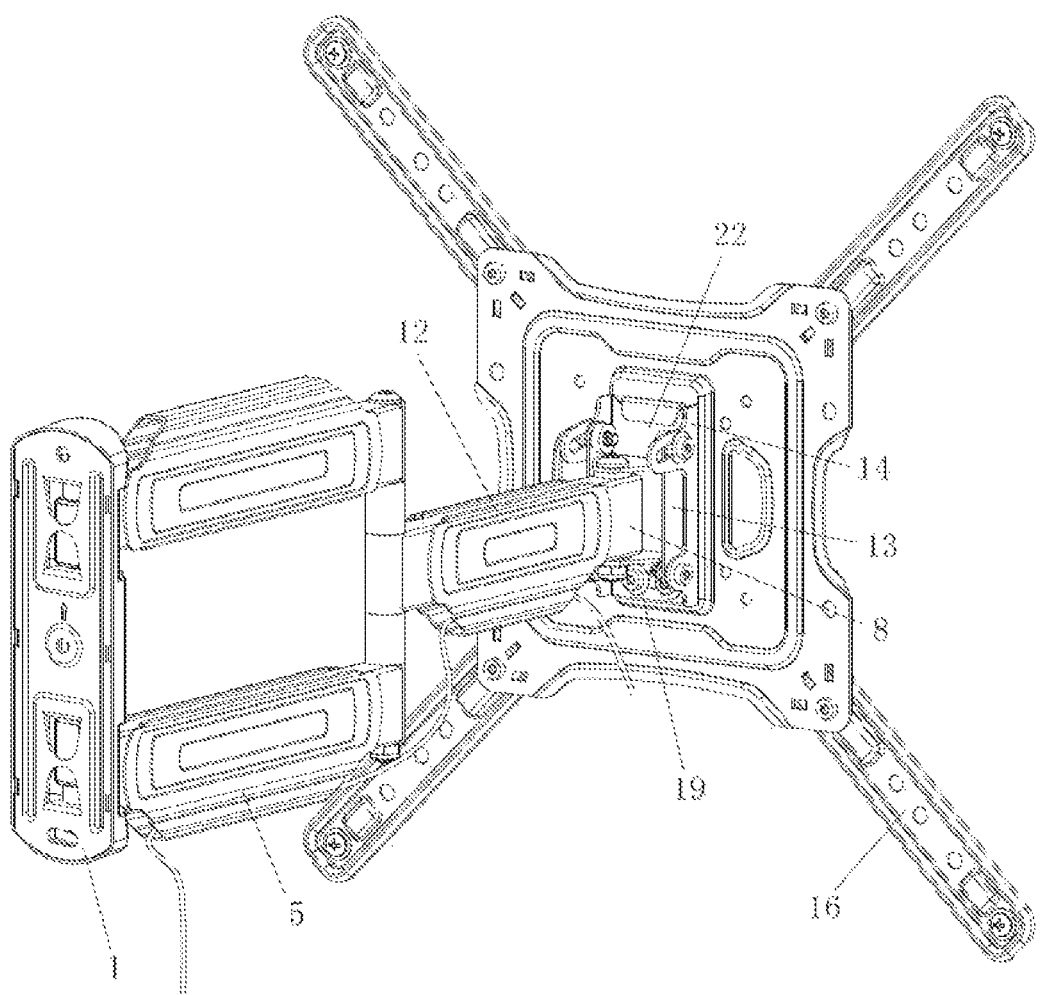
FIG. 2 is a diagram of a three-dimensional structure of an adjustable angle television mounting apparatus in accordance with an embodiment of the present disclosure seen from another view.
Figure 3:
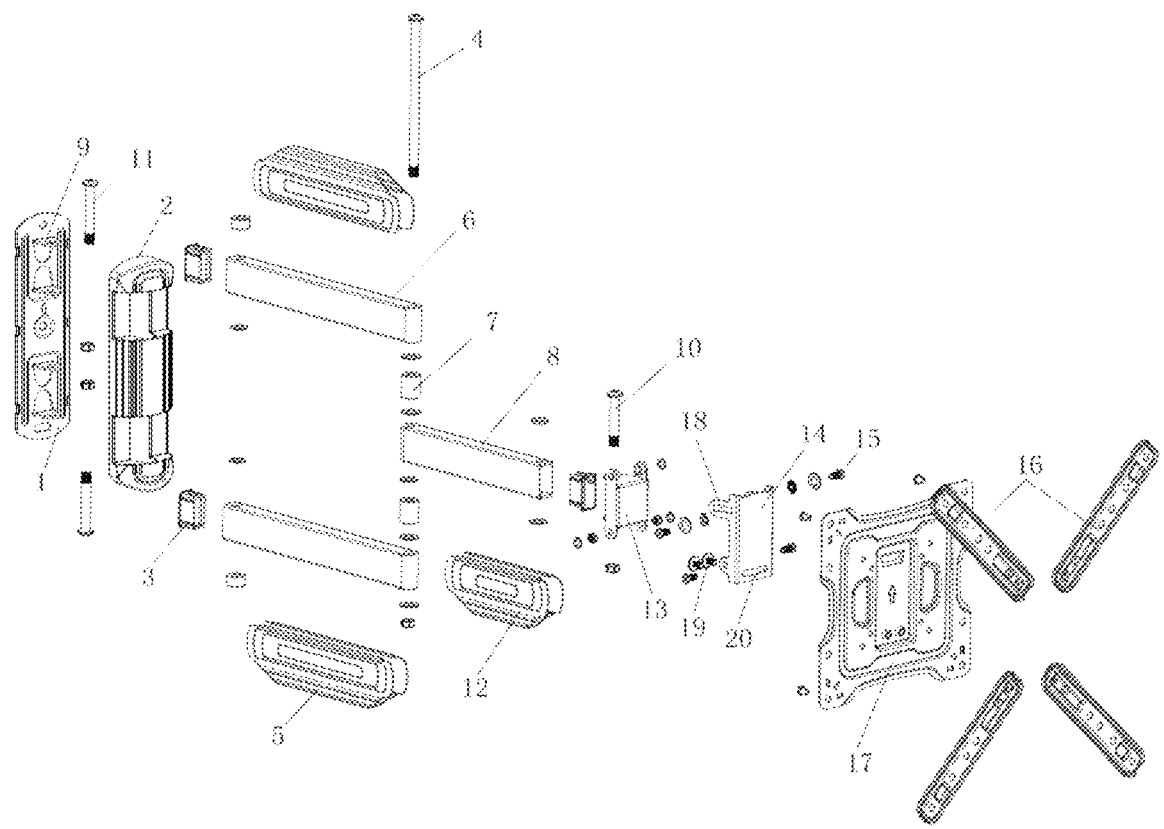
FIG. 3 is an exploded diagram of a three-dimensional structure of an adjustable angle television mounting apparatus in accordance with an embodiment of the present disclosure.
Figure 4:
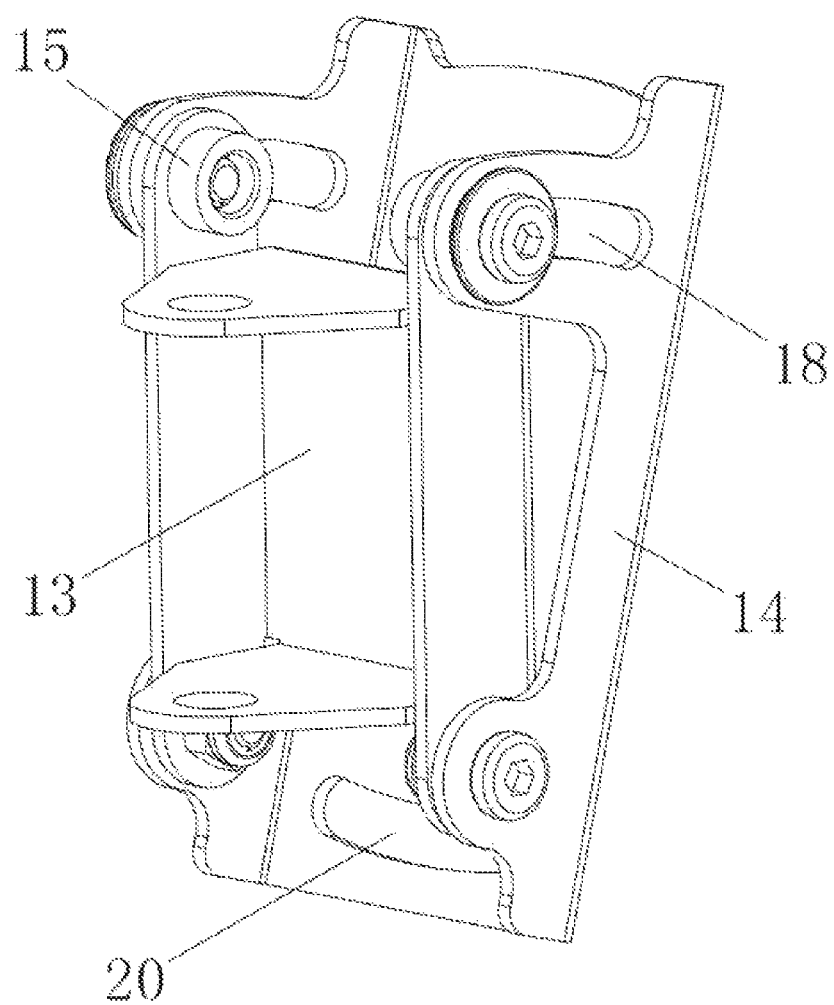
FIG. 4 is a diagram of the adjustment base assembling with the fixed base in accordance with an embodiment of the present disclosure.
Figure 5:
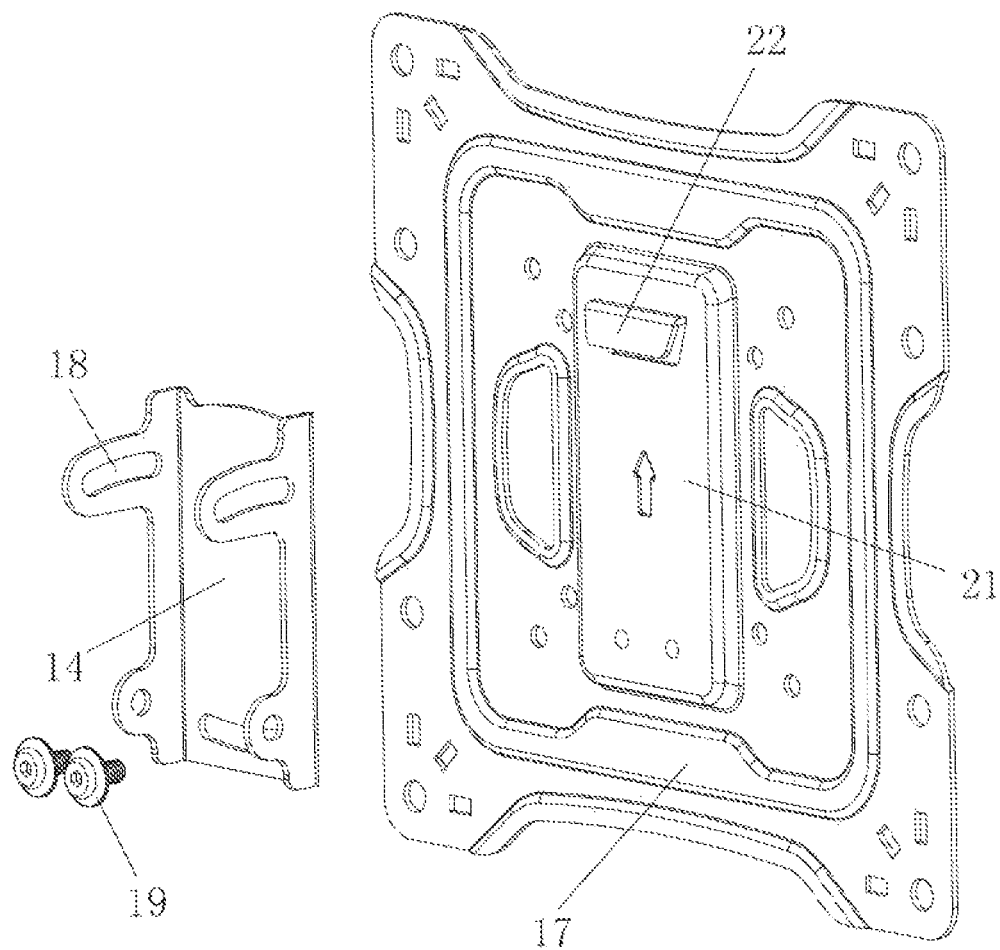
FIG. 5 is a diagram of the mounting member assembling with the adjustment base in accordance with an embodiment of the present disclosure.
Figure 6:
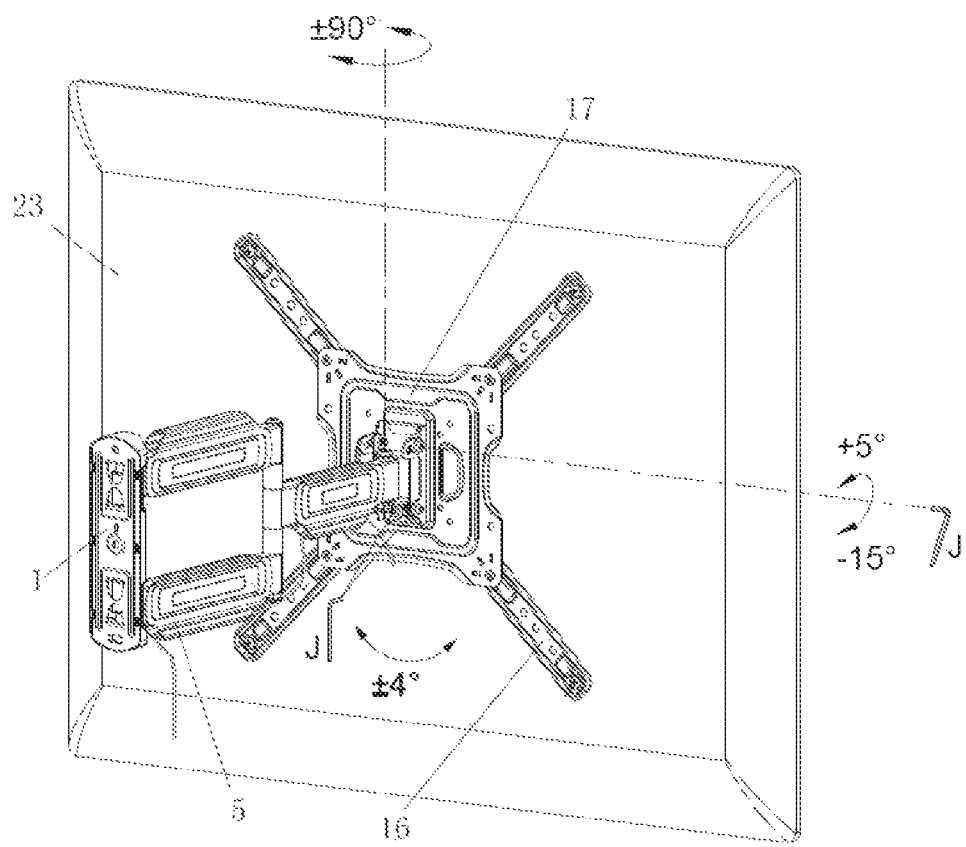
FIG. 6 is a diagram of a using state of an adjustable angle television mounting apparatus in accordance with an embodiment of the present disclosure.

Referring to FIGS. 1 to 6, in this embodiment, an adjustable angle television mounting apparatus comprises a wall plate 1, first support arms 6, a second support arm 8, an adjustment base 14 and a mounting member 17. The wall plate 1 is configured to mount to a wall (in fact, it can also be a support surface). The mounting member 17 is configured to mount a television 23. The first support arms 6 are actively mounted to the wall plate 1 through first arm threaded rods 11 to form a left and right rotating structure. The second support arm 8 is actively mounted to the first support arms 6 through a second arm threaded rod 4 to form a left and right rotating structure. The adjustment base 14 is mounted to a front end of the second support arm 8. The mounting member 17 is coupled to the adjustment base 14 to form a structure which can obliquely rotate front and rear and rotate vertically. The second support arm 8 and the first support arms 6 cooperate to make the television 23 rotate towards left or rotate towards right.

The front end of the second support arm 8 is equipped with a fixed base 13 through a head threaded rod 10. The adjustment base 14 is mounted to the fixed base 13. The adjustment base 14 defines two tilt adjusting holes 18 at two sides of an upper portion thereof respectively. Each tilt adjusting hole 18 has an arc-shaped strip structure. A bottom portion of the adjustment base 14 is coupled to the fixed base 13 through screws. The upper portion of the adjustment base 14 is coupled to the fixed base 13 through tilt adjusting screws 15 each passing through one corresponding tilt adjusting hole 18, to form a structure which can obliquely rotate front and rear. An angle of rotating front and rear is −15~+5 degrees. There is an anti-slip spacer located between each tilt adjusting screw 15 and the adjustment base 14. When the tilt adjusting screw 15 is released, the mounting member 17 can be adjusted up and down in a front-rear direction so that the television 23 is tilted up or down.

The bottom portion of the adjustment base 14 defines a vertical adjustment hole 20 having an arc-shaped strip structure. The bottom portion of the adjustment base 14 is coupled to the mounting member 17 through vertical adjusting screws 19 passing through the vertical adjustment hole 20 to form a structure which can rotate left and right. In this embodiment, the number of the vertical adjusting screws 19 is two. An angle of rotate left and right is −4~+4 degrees. When the vertical adjusting screws 19 are released, the mounting member 17 can be adjusted left and right, the television 23 is tilted to left or right to form a non-horizontal posture.

The wall plate 1 comprises two mounting bases 9 at upper and bottom portions thereof. The upper first support arm 6 is mounted to one corresponding mounting base 9 through one first arm threaded rod 11 to form a rotatable structure. The bottom first support arm 6 is mounted to another corresponding mounting base 9 through another first arm threaded rod 11 to form a rotatable structure. A plastic cover 2 is provided to cover the wall plate 1. The plastic cover 1 encloses the mounting bases 9. The two first support arms 6 each is equipped with one first arm cable clamp 5 for strengthening the structure. The first arm cable clamp 5 encloses main part of the first support arm 6. The second support arm 8 is equipped with one second arm cable clamp 12 for strengthening the structure. The second arm cable clamp 12 encloses main part of the second support arm 8. After adding the first arm cable clamps 5 and the second cable clamp 12, it can increase the strength of the first support arms 6 and the second support arm 8 and increase the overall load-bearing capacity.

There are pipe stoppers 3 equipped with ends of the two first support arms 6 and coupled to the mounting base 9 for strengthening the structure. Each first arm threaded rod 11 passes through the corresponding first support arm 6 and the corresponding pipe stopper 3, and then couples with the mounting base 9. There is a pipe stopper equipped with the front end of second support arm 8 for strengthening the structure. The pipe stopper can increase a strength of a junction of the support arm and increase the overall load-bearing capacity.

The mounting member 17 is provided with a strengthening portion 21 at a back thereof. An upper portion of the strengthening portion 21 is provided with a hanging arm 22 which protrudes rearwards to form a hook shape. The mounting member 17 is fastened on the adjustment base 9 through the hanging arm 22 to form a fixed structure. The television or the display can be mounted by hanging and can be quickly mounted.

The mounting member 17 comprises a plurality of retractable bars 16 for mounting the television 23. Each retractable bar 16 defines a plurality of mounting holes thereof.

In detail, the number of the retractable bars 16 are four. Four retractable bars 16 are set diagonally so that they can accommodate different sizes of televisions or displays.

Two spacer rings 7 are arranged on an upper and a lower sides of the second support arm 8 respectively. The second arm threaded rod 4 passes through the second support arm 8 and the spacer rings 7 and is coupled with the two first support arms 6. This structure makes the second support arm 8 rotate smoothly and stably.

The first support arms 6 and the second support arm 8 are welded using square tubes and metal sleeves. They have higher structural strength and bearing capacity.

In present disclosure, the television (or display) can be tilted upwards, downwards, rotated left or right, and raised or lowered height by mutual cooperation of the wall plate, the first support arms, the second support arm, the adjustment base and the mounting member, so that it can be flexibly adjusted according to the actual observation needs of users, which improves its adaptability. At the same time, the entire apparatus has simple structure, high strength, good stability, and can withstand greater weight.

The above are embodiments of the present disclosure, and it should be noted that those skilled in the art may make some improvements and modifications without departing from the principle of the present disclosure, and these improvements and modifications are also the protection scope of the present disclosure.

What is claimed is:

1. An adjustable angle television mounting apparatus, wherein, the adjustable angle television mounting apparatus comprises a wall plate, first support arms, a second support arm, an adjustment base and a mounting member, the wall plate is configured to mount to a wall, the mounting member is configured to mount a television, the first support arms are actively mounted to the wall plate through first arm threaded rods to form a left and right rotating structure, the second support arm is actively mounted to the first support arms through a second arm threaded rod to form a left and right rotating structure, the adjustment base is mounted to a front end of the second support arm, the mounting member is coupled to the adjustment base to form a structure which can obliquely rotate front and rear and rotate vertically; the front end of the second support arm is equipped with a fixed base through a head threaded rod, the adjustment base is mounted to the fixed base, a bottom portion of the adjustment base defines a vertical adjustment hole having an arc-shaped strip structure, the bottom portion of the adjustment base is coupled to the mounting member through vertical adjusting screws passing through the vertical adjustment hole to form a structure which can rotate left and right.

2. The adjustable angle television mounting apparatus according to claim 1, wherein, the adjustment base defines two tilt adjusting holes at two sides of an upper portion thereof respectively, each tilt adjusting hole has an arc-shaped strip structure, a bottom portion of the adjustment base is coupled to the fixed base through screws, an upper portion of the adjustment base is coupled to the fixed base through tilt adjusting screws each passing through one corresponding tilt adjusting hole, to form a structure which can obliquely rotate front and rear.

3. The adjustable angle television mounting apparatus according to claim 2, wherein, an angle of rotating front and rear is −15~+5 degrees.

4. The adjustable angle television mounting apparatus according to claim 2, wherein, there is an anti-slip spacer located between each tilt adjusting screw and the adjustment base.

5. The adjustable angle television mounting apparatus according to claim 1, wherein, an angle of rotating left and right is −4~+4 degrees.

6. The adjustable angle television mounting apparatus according to claim 1, wherein, the wall plate comprises two mounting bases at upper and bottom portions thereof, the adjustable angle television mounting apparatus comprises two first support arms, an upper first support arm of the two first support arms is mounted to one corresponding mounting base through one first arm threaded rod to form a rotatable structure, a bottom first support arm of the two first support arms is mounted to another corresponding mounting base through another first arm threaded rod to form another rotatable structure.

7. The adjustable angle television mounting apparatus according to claim 6, wherein, a plastic cover is provided to cover the wall plate, the plastic cover encloses the mounting bases.

8. The adjustable angle television mounting apparatus according to claim 6, wherein, the two first support arms each is equipped with one first arm cable clamp for strengthening the structure, the first arm cable clamp encloses main part of one of the two first support arms which the first arm cable clamp enclosed thereon, the second support arm is equipped with one second arm cable clamp for strengthening the structure, the second arm cable clamp encloses main part of the second support arm.

9. The adjustable angle television mounting apparatus according to claim 6, wherein, there are pipe stoppers equipped with ends of the two first support arms and coupled to the mounting base for strengthening the structure, each first arm threaded rod passes through one of the two first support arms and a corresponding pipe stopper, and then couples with the mounting base, there is a pipe stopper equipped with the front end of second support arm for strengthening the structure.

10. The adjustable angle television mounting apparatus according to claim 1, wherein, the mounting member is provided with a strengthening portion at a back thereof, an upper portion of the strengthening portion is provided with a hanging arm which protrudes rearwards to form a hook shape, the mounting member is fastened on the adjustment base through the hanging arm to form a fixed structure.

11. The adjustable angle television mounting apparatus according to claim 1, wherein, the mounting member comprises a plurality of retractable bars for mounting the television, each retractable bar defines a plurality of mounting holes thereof.

12. The adjustable angle television mounting apparatus according to claim 11, wherein, the number of the retractable bars are four, four retractable bars are set diagonally.

13. The adjustable angle television mounting apparatus according to claim 11, wherein, two spacer rings are arranged on an upper and a lower sides of the second support arm respectively, the second arm threaded rod passes through the second support arm and the spacer rings and is coupled with the two first support arms.

14. The adjustable angle television mounting apparatus according to claim 11, wherein, the first support arms and the second support arm are welded using square tubes and metal sleeves.

15. An adjustable angle television mounting apparatus, wherein, the adjustable angle television mounting apparatus comprises a wall plate, first support arms, a second support arm, an adjustment base and a mounting member; the wall plate is configured to mount to a wall; the mounting member is configured to mount a television; the first support arms are actively mounted to the wall plate through first arm threaded rods to form a left and right rotating structure; the second support arm is actively mounted to the first support arms through a second arm threaded rod to form a left and right rotating structure; the adjustment base is mounted to a front end of the second support arm; the mounting member is coupled to the adjustment base to form a structure which can obliquely rotate front and rear and rotate vertically; the mounting member is provided with a strengthening portion at a back thereof; an upper portion of the strengthening portion is provided with a hanging arm which protrudes rearwards to form a hook shape; the mounting member is fastened on the adjustment base through the hanging arm to form a fixed structure.

\* \* \* \* \*